United States Patent [19]

Roetling

[11] 3,888,591

[45] June 10, 1975

[54] IMAGE SUBTRACTION APPARATUS

[75] Inventor: Paul G. Roetling, Ontario, N.Y.

[73] Assignee: Xerox Corporation, Stamford, Conn.

[22] Filed: Jan. 21, 1974

[21] Appl. No.: 434,855

[52] U.S. Cl. .................... 356/114; 350/161; 356/71

[51] Int. Cl. ............................................. G01n 21/40

[58] Field of Search ...... 356/114, 71; 350/161, 162, 350/164, 168

[56] References Cited

UNITED STATES PATENTS

| | | | |
|---|---|---|---|
| 3,481,673 | 12/1969 | Freeman | 356/168 |
| 3,716,359 | 2/1973 | Sheridan | 350/3.5 UX |

*Primary Examiner*—Ronald L. Wibert
*Assistant Examiner*—Paul K. Godwin
*Attorney, Agent, or Firm*—J. J. Ralabate; D. C. Petre; J. B. Mitchell

[57] ABSTRACT

A system for subtracting two object images is disclosed. The system includes encoding means for providing first and second encoded images, and filtering means for passing the first and second encoded images, through corresponding first and second optical paths, to an optical recording medium. The optical recording medium has a deformable surface which responds to the absolute difference between the first and second encoded images, as passed through the first and second optical paths, respectively. A source of intensive light is then focused onto the deformable image for producing a readout corresponding to the real time, absolute difference between the object images.

25 Claims, 6 Drawing Figures

PATENTED JUN 10 1975

3,888,591

IMAGE SUBTRACTION APPARATUS

BACKGROUND OF THE INVENTION

This invention relates to an image subtraction system in general, and in particular to an apparatus for providing the real-time, absolute difference between the intensity of two object images.

At the present time, image processing systems utilizing incoherent optics have been hampered by the lack of good means for subtracting two object images. One previous attempt to approximate image subtraction utilizes the quenching properties of fluorescent screens, but this effort has not met with great success. Other efforts at image subtraction have been similarly unsuccessful.

The image subtraction system of the invention utilizes the properties of an optical recording medium of the type disclosed by Nicholas K. Sheridan in U.S. Pat. No. 3,716,359, entitled "Cyclic Recording System By The Use Of An Elastomer In An Electric Field." As explained in greater detail hereinafter, such an optical recording medium has a photo-conductive surface for receiving optical images, and a deformable metal surface, modulated by the images received at the photo-conductive surface. By applying a highly focusable beam of light, such as a laser, to the deformable metal surface, a first order diffracted image, or readout, corresponding to the modulations of the deformable metal surface, can be produced.

The subtraction system further utilizes means for encoding the two images to be subtracted, and a filter having alternately disposed areas that respectively pass the two encoded images to the optical recording medium. In a manner more fully explained hereinafter, the transmission of alternate portions of the encoded images to the optical recording medium modulates the deformable metal surface thereof so that the readout has an intensity which is a monotonic function of the absolute difference between the two images to be subtracted. Because it utilizes a minimal number of relatively inexpensive elements, the subtraction system of the invention provides accurate, real-time image subtraction at a minimal cost.

OBJECTS OF THE INVENTION AND A BRIEF DESCRIPTION OF THE DRAWINGS

It is the primary object of this invention to provide an improved image subtraction system.

It is another object of this invention to provide an improved image subtraction system utilizing an optical recording medium having a deformable surface.

It is a further object of this invention to provide means for achieving accurate, real-time image subtraction at a minimal cost.

A still further object of this invention is to provide an improved method for subtracting optical images.

Other objects, features, and advantages of the invention will be apparent upon reading the following detailed description of an exemplary embodiment of the invention in conjunction with the accompanying drawings in which.

DETAILED DESCRIPTION OF EXEMPLARY EMBODIMENTS OF THE INVENTION

Figure 1:
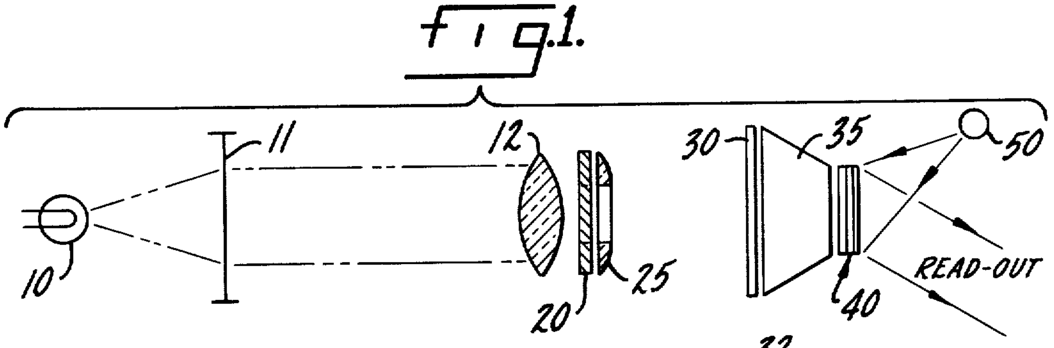
FIG. 1 is a schematic diagram of the optical elements comprising the image subtraction system of the invention.

Referring now to FIG. 1, a light source 10 is aligned behind a transparency 11 for producing an object image. It should be noted, however, that other means can be used for producing one or more object images without departing from the spirit of the invention, and therefore, light source 10 and transparency 11 should not be construed as limitative. An imaging lens 12 passes light from the object to an encoding means 20.

Figure 2:
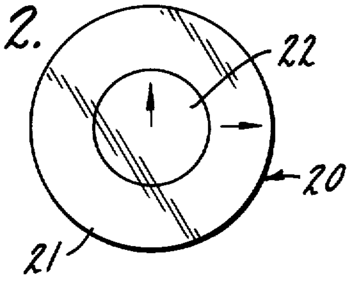
FIG. 2 is an enlarged front view of a portion of the image subtraction system shown in FIG. 1.

Encoding means 20 may take any one of several forms, but in the preferred embodiment, comprises conventional polarizing material as shown in FIG. 2. More particularly, encoding means 20 include a center, circular portion 22 and an outer, annular portion 21. Center portion 22 is disposed so that the image passing therethrough is vertically polarized. Annular portion 21, however, is disposed 90° relative to circular portion 22, thereby causing the light passing through annular portion 21 to be horizontally polarized. An alternative form of encoding means 20 may include means for encoding two different color images, for example, red and blue color filters.

Associated with encoding means 20 is an annular-shaped, partial lens 25, adapted to defocus the horizontally polarized image emerging from annular portion 21 of encoding means 20. Partial lens 25, however, does not defocus the vertically polarized image emerging from circular portion 22 of encoding means 20. Thus, two encoded images emanate from partial lens 25: a defocused horizontally polarized image, and a properly focused vertically polarized image.

Figure 3:
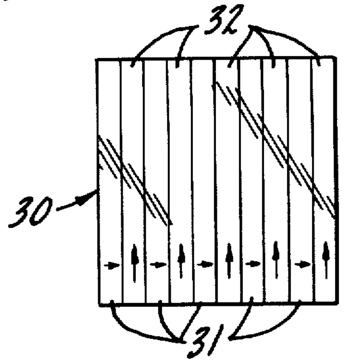
FIG. 3 is an enlarged front view of another portion of the image subtraction system shown in FIG. 1.

Disposed in optical relationship with encoding means 20 is an optical filter 30, adapted to receive the horizontally and vertically polarized images from encoding means 20. Optical filter 30, shown in greater detail in FIG. 3, has a first plurality of areas 31 and a second plurality of areas 32. Areas 31 and 32 are alternately disposed vertical strips on filter 30. In the preferred embodiment, optical filter 30 includes four to ten pairs of vertical strips per millimeter though, of course, these numbers should not be viewed as limitative, the true scope of the invention being defined in the appended claims. Of course, optical filter 30 need not be limited to alternating vertical strips but can be comprised of any alternating pattern such as horizontal, circular or checkerboard arrays.

The vertical strips comprising areas 31 are adapted to substantially exclusively pass horizontally polarized light, and the vertical strips comprising areas 32 are adapted to substantially exclusively pass vertically polarized light. The material comprising areas 31 and 32 is polarizable raw film stock sometimes identified as "Vectograph," a trademark of the Polaroid Corporation of Cambridge, Mass. Optical filter 30 thus passes the defocused horizontally polarized image only through areas 31, and optical filter 30 only passes the properly focused vertically polarized image through areas 32. Areas 31 and 32, therefore, define optical paths for the horizontally and vertically polarized images, respectively.

As shown in FIG. 1, a high quality reduction lens 35 is disposed in optical alignment between optical filter 30 and an optical recording medium 40. Reduction lens 35 provides a high quality reduction of the horizontally and vertically encoded images passed to optical recording medium 40.

Figures 4, 6:
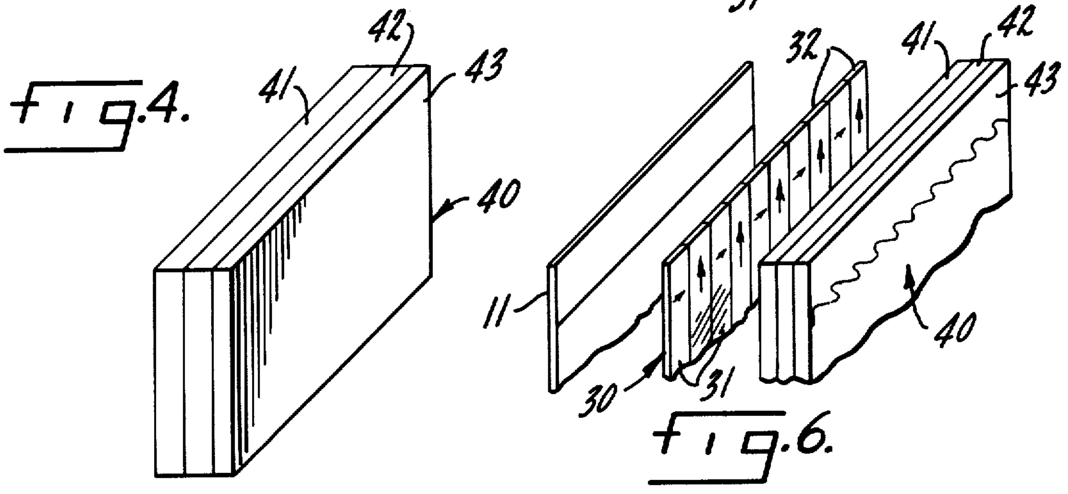
FIG. 4 is an enlarged perspective view of a further portion of the image subtraction system shown in FIG. 1.
FIG. 6 is an enlarged partial view, taken in perspective, of the image subtraction system shown in FIG. 1, with several elements removed, wherein a horizontal stroke comprises a single object image.

Optical recording medium 40 is shown in greater detail in FIG. 4 and, as mentioned hereinbefore, is fully described in Nicholas K. Sheridan's U.S. Pat. No. 3,716,359 entitled "Cyclic Recording System By The Use Of An Elastomer In An Electric Field." In brief, however, optical recording medium 40 includes an elastomer 42 bonded between a photo-conductive surface 41 and a deformable metal surface 43. Elastomer 42 can be any amorphous, incompressible material which deforms under a force. Photo-conductive surface 41 can be made of any material which allows the passage of an increased electric charge in those regions which are exposed to light, such as the regions to which the horizontally and vertically polarized images are passed after emerging from optical filter 30. Since deformable metal surface 43 is bonded to elastomer 42, any mechanical force causing the deformation thereof, will cause a corresponding deformation in deformable metal surface 43. A voltage (not shown) is impressed between a transparent substrate electrode (not shown) associated with photo-conductive surface 41, and deformable metal surface 43, thereby placing an electric field across elastomer 42.

When a light image is received at photo-conductive surface 41, the passage of electric charges increases in accordance with the intensity of the light image, thereby modulating the electric field across elastomer 42. This modulation, of course, occurs in those regions which correspond to the regions on photo-conductive surface 41 which were exposed to the light image received thereat. The modulation of the electric field by the light image applied to photo-conductive surface 41 produces a mechanical force corresponding to the intensity of the light image. This mechanical force deforms elastomer 42 to the shape of the light image received at photo-conductive surface 41. Because it is bonded to elastomer 42, deformable metal surface 43 deforms accordingly. Thus, for example, if a single encoded image is passed from encoding means 20, through a corresponding optical path in optical filter 30 and onto photo-conductive surface 41 of optical recording medium 40, deformable metal surface 43 will be modulated to the shape of that image.

The particular manner in which elastomer 42 and deformable metal surface 43 deform to the shape of the optical image appied to photo-conductive surface 41 requires further explanation. In particular, when an optical image is passed through an optical path in optical filter 30 to photo-conductive surface 41, a mechanical force is applied to elastomer 42. This force, however, is not uniform, but has maxima and minima corresponding to the regions where light is alternately passed and blocked by alternate areas 31 and 32 in optical filter 30. The maxima and minima components of the force applied to elastomer 42, cause corresponding depressions and bulges therein, thus producing a "wrinkled" reproduction of the object image on deformable metal surface 43. The "wrinkled" reproduction of an object image corresponding to a horizontal stroke is shown in FIG. 6.

When two encoded images are passed respectively through areas 31 and 32 of optical filter 30, light is passed through the optical paths defined thereby. As a result, the mechanical force applied to elastomer 42 does not necessarily have the maxima and minima components associated with the application of a single encoded image. More particularly, if the two encoded images represented identical objects, such as horizontal strokes, for example, light would not be alternately passed and blocked by areas 31 and 32 as in the case of a single image (FIG. 6), but would be passed through appropriate portions of both areas 31 and 32. As a result, a mechanical force would be uniformly applied to elastomer 42 at regions corresponding to those regions on photo-conductive surface 41 where light is passed from areas 31 and 32 of optical filter 30. Since elastomer 42 is incompressible, however, elastomer 42, and hence deformable metal surface 43, would remain in place, thereby preventing alternating depressions and bulges to be formed therein. When light source 50 is then applied to deformable metal surface 43, minimal light is diffracted therefrom, and therefore, upon readout, no image will be reconstructed. This, in effect, is the real-time difference in the absolute value of the two identical object images.

In the specific embodiment represented by FIG. 1, the images to be subtracted are not identical but, as explained hereinbefore, represent a properly focused image and a defocused image thereof. The properly focused image is vertically polarized and the defocused image is horizontally polarized. When both of these polarized images are applied to optical filter 30, areas 31 provide an optical path to optical recording medium 40 for the horizontally polarized image, and areas 32 provide an optical path to optical recording medium 40 for the vertically polarized image. Both the horizontally and vertically polarized images cause the passage of electrical charges through photo-conductive surface 41 to increase, thereby modulating the electric field across elastomer 42. As a result, a mechanical force causes elastomer 42 to deform, and depressions and bulges to appear in deformable metal surface 43. These depressions and bulges correspond to the absolute difference in the intensity of the properly focused vertically polarized image and the defocused horizontally polarized image applied to recording medium 40. The readout, produced by light source 50, is thus the difference between a focused image and a defocused image which desirably corresponds to an over-contrasted or "crispened" image.

Figure 5:
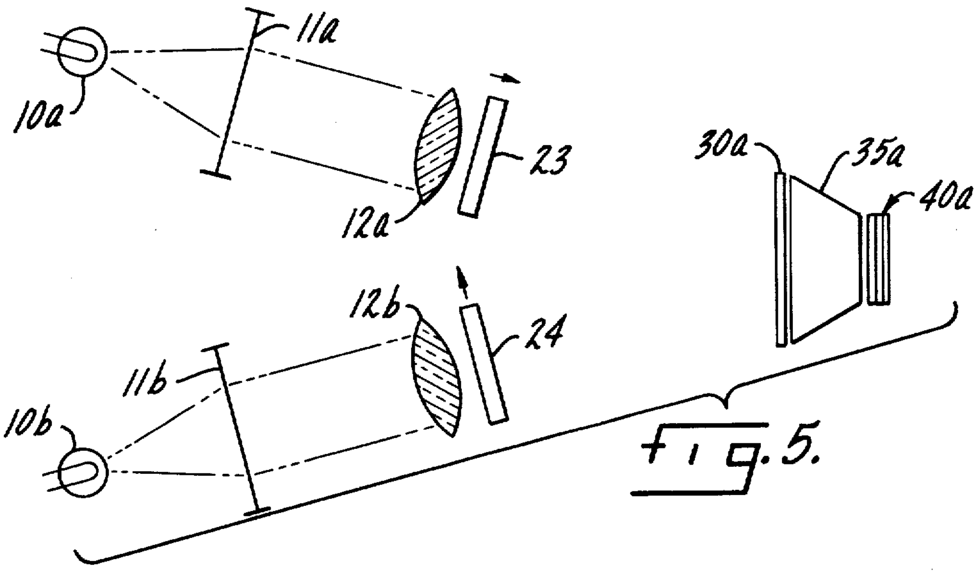
FIG. 5 is a schematic diagram of the optical elements comprising a second embodiment of the image subtraction system of the invention.

FIG. 5 shows a second embodiment of the image subtraction system of the invention. More particularly, a pair of light sources 10*a* and 10*b* are aligned behind a respective pair of transparencies 11*a* and 11*b* for producing a pair of object images to be subtracted. Light from the first object is passed through a focusing lens 12*a* to an encoding means 23 which produces a horizontally polarized image of the first object image. Similarly, light from the second object is passed through a focusing lens 12*b* to an encoding means 24 which produces a vertically polarized image of the second object image. The two object images are then passed to an optical filter 30*a*, identical in structure and function to optical filter 30 in FIG. 1. Optical filter 30*a* includes alternate strips of polarizable material which pass respective portions of the vertically and horizontally polarized images through a high quality reduction lens 35*a* to an optical recording medium 40*a*. Reduction lens 35*a* and optical recording medium 40*a* are identical to reduction lens 35 and optical recording medium 40 in FIG. 1. In a manner described hereinbefore, a deformable metal surface in optical recording medium 40 *a* produces a deformed image corresponding to the real-time, absolute difference in the intensity of the images received thereby. Upon readout, an image corresponding to this real-time absolute difference is produced.

Though the described embodiments of the image subtraction system of the invention are preferred, other embodiments which do not part from the spirit of the invention can be produced. Accordingly, the invention should not be limited to any specific embodiment described herein, but should be permitted the full coverage as defined in the appended claims.

Still referring to FIG. 5, an alternative embodiment of the present invention requires the application of uniform light from light source 10*b* directly through focusing lens 12*b* to encoding means 24. Transparency 11*b* is not used to produce an object image. Transparency 11*a*, however, is used to produce an object image, the light from the object being passed through focusing lens 12*a* to encoding means 24 in the same manner hereinbefore described. The uniform light from light source 10*b* is vertically polarized by encoding means 24, and the light from transparency 11*a* is horizontally polarized by encoding means 23. These vertically and horizontally polarized images are then passed through optical filter 30*a* and reduction lens 35*a* to optical recording medium 40*a* in a now familiar manner. In accordance with the principles of the present invention, the resultant recorded image will be opposite in image sense from that of the image which comprises the object carried by transparency 11*a*.

I claim:

1. An image subtraction system comprising:

encoding means for producing a first encoded image and a second encoded image;

filtering means, in optical relationship with said encoding means, having a first area for passing said first encoded image and a second area for passing said second encoded image; said first area and said second area being alternately disposed on said filtering means; and optical recording means, in optical relationship with said filtering means, responding to the absolute difference between said first encoded image and said second encoded image.

2. The system recited in claim 1 wherein said encoding means include polarizing means producing a first directionally polarized image corresponding to said first encoded image, and a second directionally polarized image corresponding to said second encoded image; said first encoded image being polarized in a direction different from said second encoded image.

3. The system recited in claim 2 wherein said first area of said filtering means include first polarizing material having a polarizing direction corresponding to said first encoded image, and said second area of said filtering means include second polarizing material having a polarizing direction corresponding to said second encoded image.

4. The system recited in claim 3 wherein said first polarizing material and said second polarizing material form alternate vertical strips on said filtering means.

5. The system recited in claim 2 wherein said encoding means further include a partial lens for defocusing one of said directionally polarized images.

6. The system recited in claim 1 wherein said optical recording means include a photo-conductive surface, a deformable surface and an elastomer surface bonded therebetween; said photo-conductive surface and said deformable surface having a potential difference applied thereacross, whereby said deformable surface deforms in accordance with the absolute difference between the intensity of said first encoded image and the intensity of said second encoded image.

7. The system recited in claim 6 further including image reduction means secured between said filtering means and said photo-conductive surface.

8. The system recited in claim 6 further including a source of intense light focusable upon said deformable surface for producing a readout corresponding to the absolute difference between said first encoded image and said second encoded image.

9. An image subtraction system comprising:

imaging means for producing a first image and a second image;

image encoding means, in optical relationship with said imaging means, for producing a first encoded image corresponding to the intensity of said first image and a second encoded image corresponding to the intensity of said second image;

filtering means, having a first area for passing said first encoded image and a second area for passing said second encoded image; said first area and said second area being alternately disposed on said filtering means; and optical recording means, in optical relationship with said filter means, responsive to the absolute difference between said first encoded image passed through said first area and said second encoded image passed through said second area, whereby said optical recording means record the absolute difference between the intensity of said first image and the intensity of said second image.

10. The system recited to claim 9 wherein said image encoding means include polarizing means for polarizing said first image in a first direction and polarizing said second image in a second direction different from said first direction.

11. The system recited in claim 10 wherein said first area of said filtering means is polarized in said first direction for passing said first encoded image and said second area of said filtering means is polarized in said second direction for passing said second encoded image.

12. The system recited in claim 11 wherein said first area and said second area from alternate vertical strips on said filtering means.

13. The system recited in claim 9 wherein said optical recording means include a photo-conductive surface, a deformable surface and an elastomer surface secured therebetween; said photo-conductive surface and said deformable surface having a potential difference applied thereacross, whereby said deformable surface deforms in accordance with the absolute difference between the intensity of said first encoded image and the intensity of said second encoded image.

14. The system recited in claim 13 further including image reduction means secured between said filter means and said photo-conductive surface.

15. The system recited in claim 13 further including a source of intense light focusable upon said deformable surface for producing a readout corresponding to the absolute difference between said first encoded image and said second encoded image.

16. An image subtraction system comprising:

imaging means for producing an object image;

first image encoding means, in optical relationship with said imaging means, for producing a first encoded image corresponding to the intensity of said object image;

a light source for producing a beam of uniform light;

second image encoding means, in optical relationship with said light source, for producing a second encoded image corresponding to the intensity of said beam of uniform light;

filtering means, having a first area for passing said first encoded image and a second area for passing said second encoded image; said first area and said second area being alternately disposed on said filtering means; and optical recording means, in optical relationship with said filtering means, responsive to the absolute difference between said first encoded image passed through said first area and said second area, whereby said optical recording means record an image opposite in image sense from said object image.

17. The system recited in claim 16 wherein said first image encoding means include means for polarizing said object image in a first direction and polarizing said beam of light in a second direction different from said first direction.

18. The system recited in claim 17 wherein said first area of said filtering means is polarized in said first direction for passing said first encoded image and said second area of said filtering means is polarized in said second direction for passing said second encoded image.

19. The system recited in claim 18 wherein said first area and said second area form alternate vertical strips on said filtering means.

20. The system recited in claim 16 wherein said optical recording means include a photo-conductive surface, a deformable surface and an elastomer surface secured therebetween; said photo-conductive surface and said deformable surface having a potential difference applied thereacross, whereby said deformable surface deforms in accordance with the absolute difference between the intensity of said first encoded image and the intensity of said second encoded image.

21. The system recited in claim 20 further including image reduction means secured between said filtering means and said photo-conductive surface.

22. The system recited in claim 20 further including a source of intense light focusable upon said deformable surface for producing a readout corresponding to the absolute difference between said first encoded image and said second encoded image.

23. A method for subtracting object images comprising the steps of:

encoding said object images to produce a first encoded image and a second encoded image;

filtering said first encoded image through a first optical path and filtering said second encoded image through a second optical path; said first optical path being defined by a first area of polarizable material adapted to pass said first encoded image and said second optical path being defined by a second area of polarizable material adapted to pass said second encoded image; said first area and said second area being alternately disposed; and recording said first encoded image and said second encoded image on an optical recording medium having a deformable surface responsive to the absolute difference between said first encoded image as passed through said first optical path, and said second encoded image as passed through said second optical path.

24. The method recited in claim 23 wherein said first encoded image is polarized in a first direction and said second encoded image is encoded in a second direction.

25. The method recited in claim 23 further including the step of focusing a source of intense light onto said deformable surface for producing a readout corresponding to the absolute difference between said object images.

* * * * *